March 29, 1966     J. GRILLO     3,243,598
LOAD DIVISION IN AN UNINTERRUPTED POWER SYSTEM
Filed Dec. 13, 1961     4 Sheets-Sheet 1
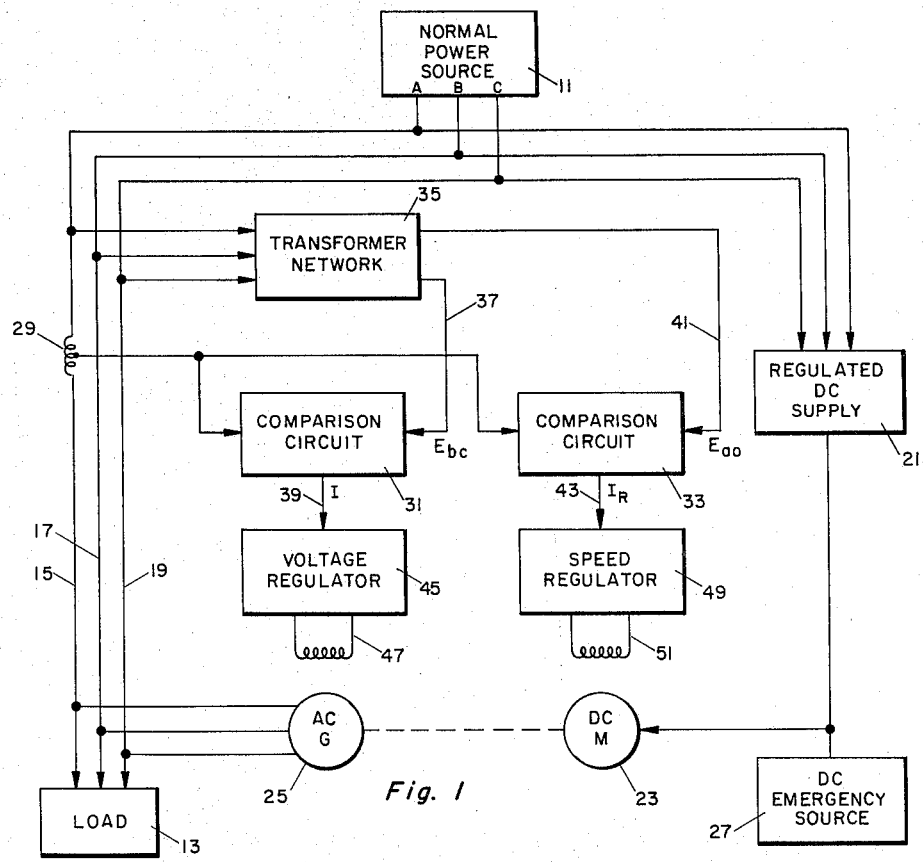
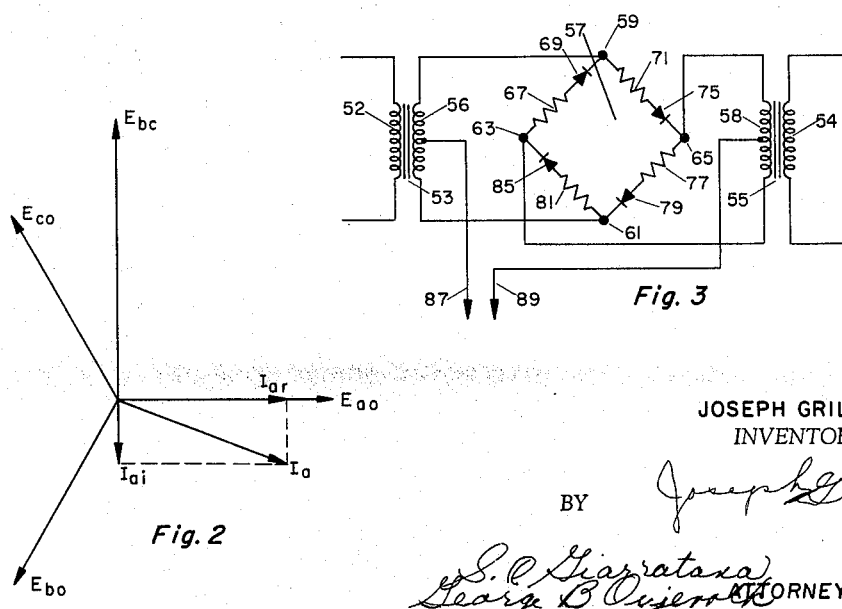
JOSEPH GRILLO
*INVENTOR.*

March 29, 1966  J. GRILLO  3,243,598
LOAD DIVISION IN AN UNINTERRUPTED POWER SYSTEM
Filed Dec. 13, 1961  4 Sheets-Sheet 2

JOSEPH GRILLO
INVENTOR.

JOSEPH GRILLO
INVENTOR.

United States Patent Office 3,243,598
Patented Mar. 29, 1966

3,243,598
LOAD DIVISION IN AN UNINTERRUPTED POWER SYSTEM
Joseph Grillo, New Milford, N.J., assignor to General Precision, Inc., Little Falls, N.J., a corporation of Delaware
Filed Dec. 13, 1961, Ser. No. 159,121
11 Claims. (Cl. 307—68)

This invention relates to uninterrupted power systems, and more particularly to an uninterrupted power system in which a desired division of power between a generator and the power line is maintained.

An uninterrupted power system is one in which power continues to flow to a vital load when the flow of power from the normal source is interrupted. When an interruption in the flow of power from the normal source occurs, power is supplied to the load from an emergency source which, for example, can be a battery.

In the particular system to which the present invention applies, power lines connect the load directly to a normal A.C. source. An A.C. generator is also connected to these power lines to supply power to the load in parallel with the normal source. The A.C. generator is driven by a D.C. motor, which is energized by the emergency source of power when power flow from the normal source is interrupted. Under normal conditions, when power is available from the normal source, the D.C. motor is energized from a D.C. supply, which derives its power from the normal A.C. source. Thus under normal conditions power flows from the source directly over the power lines to the load and from the source through the motor and generator to the load.

In this type of system it is desirable that most of the power flow to the load through the motor-generator set because when a large percentage of the power flows to the load directly over the power lines, large transients in voltage and frequency appear at the load when the flow of power from the normal source of power is interrupted. These transients are undesirable and cannot be tolerated in many applications. When most of the power flows to the load through the motor-generator set and very little power flows to the load directly through the power lines, very little transient voltage and frequency will appear at the load. In the system of the present invention, controls are provided to maintain over 90% of the power flow to the load under normal operating conditions through the motor-generator set, and to reduce the power flow to the load directly through the power lines to a minimum. This result is achieved by controlling the field excitations of the motor and generator in accordance with the current flowing in the power lines between the load and the normal source. The motor field excitation is controlled in response to the component of line current in phase with line voltage to reduce this component to a minimum. The generator field excitation is controlled in response to the component of line current 90° out of phase with the line voltage to reduce this component to a minimum. In this manner the current and power flowing to the load directly through the power lines is reduced to a minimum. This system is effective because the frequency and voltage on the power lines is set by the normal source and changes in the field excitations of the motor and generator will affect only the current and power flow from the generator to the power lines.

Accordingly, a principal object of the present invention is to provide an improved uninterrupted power system.

Another object of this invention is to maintain a desirable division of power in an uninterrupted power system.

A further object of this invention is to provide an uninterrupted power system in which the power flow over lines directly connecting the normal source of power to the load is reduced to a minimum.

A still further object of this invention is to reduce voltage and frequency transients at the load in an uninterrupted power system when the flow of power from the normal source of power is interrupted.

Further objects and advantages of the present invention will become readily apparent as the following detailed description of the invention unfolds, and when taken in conjunction with the accompanying drawings, wherein:

FIG. 1 is a block diagram illustrating a three-phase uninterrupted power system in accordance with the present invention;

FIG. 2 is a vector diagram illustrating phase relationships in the power system of FIG. 1;

FIG. 3 is a circuit diagram of a comparison circuit used in the system of the present invention;

Figure 4:
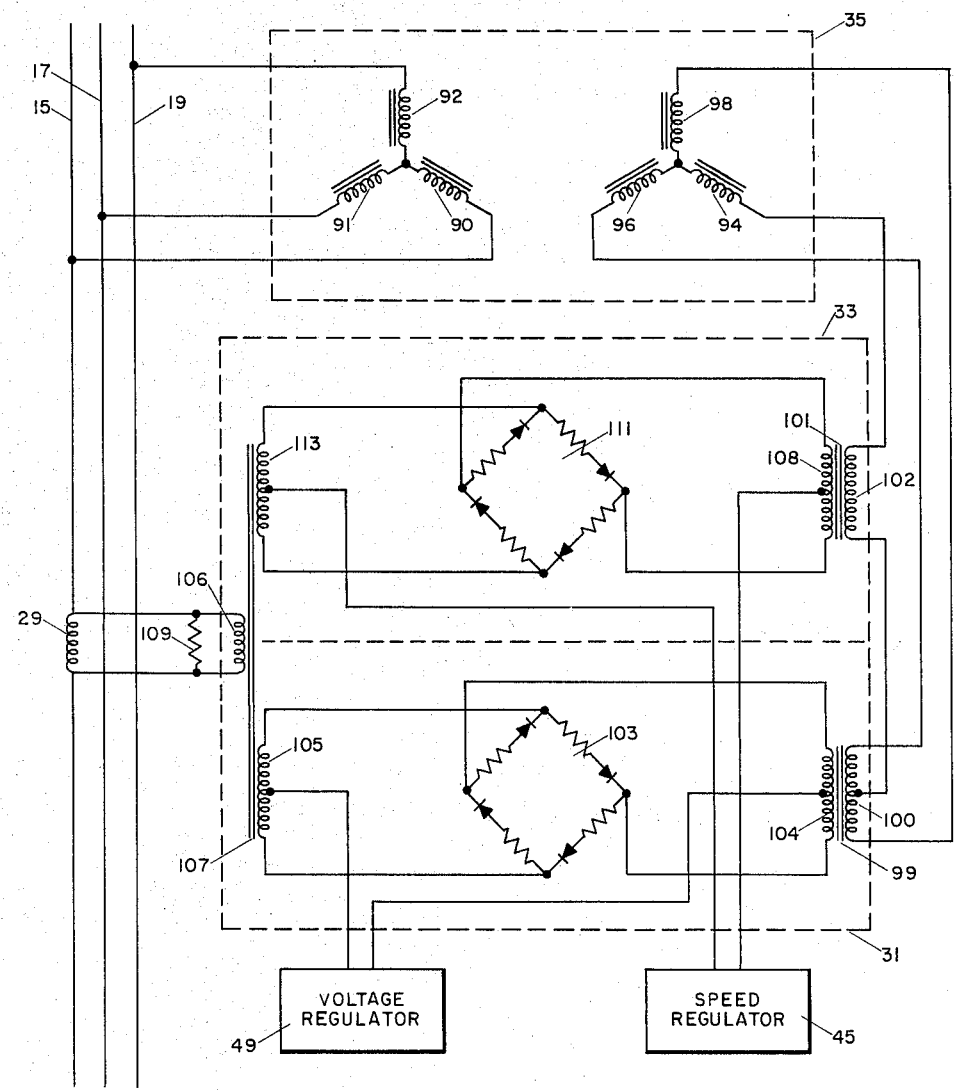
FIG. 4 is a detailed circuit diagram of the control system for the power system of FIG. 1.

As shown in FIG. 1, the normal power source 11, which comprises a three-phase power supply, is connected to supply three-phase power to a load 13 over power lines 15, 17 and 19. The power source 11 also supplies power to a regulated D.C. supply 21, which energizes a D.C. motor 23. The D.C. motor 23 drives an A.C. generator 25, which like the source 11 is a three-phase source. The A.C. generator 25 is connected to supply power to the load 13 also over lines 15, 17 and 19. Thus power can be supplied from the source 11 directly over lines 15, 17 and 19 or it can be supplied via the D.C. supply 21, the motor 23 and the A.C. generator 25. An emergency D.C. power source 27 is also connected to energize the D.C. motor 23. When the flow from the power source 11 is interrupted, the D.C. motor 23 will then be energized by the source 27 and will continue to drive the A.C. generator 25, which will then supply all the power to the load 13. In this manner an uninterrupted power system is provided so that power will always be supplied to the load 13 even if the power flow from the source 11 is interrupted.

Under normal operation, when power is being supplied from the source 11 to the load 13 it is preferable that most of the power supplied to the load 13 be supplied through the motor 23 and the generator 25 and that the power supplied directly to the load 13 over lines 15, 17 and 19 be reduced to a minimum. The system of the present invention performs the function of maintaining this load division relationship. Because most of the power from the source 11 passes through the motor 23 and the generator 25 to the load 13, very little transient voltage and frequency appear at the load when power flow from the source 11 is interrupted.

To understand how the system maintains the desired load division, reference is made to FIG. 2, which is a phase diagram of various currents and voltages of the system. Voltage $E_{ao}$ in FIG. 2 represents the voltage on line 15, voltage $E_{bo}$ represents the voltage on line 17, and voltage $E_{co}$ represents the voltage on line 19. Voltage $E_{bc}$ therefore represents the voltage between lines 17 and 19. The current $I_a$ represents the current in line 15 between the source 11 and the A.C. generator 25, and for purposes of illustration this current is shown lagging $E_{ao}$. Current $I_{ar}$ in FIG. 2 is the component of the current $I_a$ in line 15 in phase with $E_{ao}$. This component $I_{ar}$ is referred to as the real component. This real component $I_{ar}$ could also be negative or 180° out of phase with $E_{ao}$, in which case power would be flowing from the generator 25 to the source 11. The current $I_{ai}$ is the component of the current $I_a$ in line 15, 90° out of phase with $E_{ao}$. This component $I_{ai}$ is referred to as the imaginary component.

Under normal conditions when the flow of power from the source 11 is not interrupted, the frequency and the voltage on lines 15, 17 and 19 is set by the normal power source. This means that when excitation of the field winding 51 of the motor 23 is changed, the speed at which the motor 23 drives the generator 25 does not change. Because of this action, the components of current flowing from the generator 25 to the lines 15, 17 and 19 in phase $E_{ao}$, $E_{bo}$ and $E_{co}$, or in other words the real components of current, will change when the excitation of the field winding 51 of the motor is changed. Similarly, when the excitation of the field winding 47 of the generator 25 is changed, the output voltage of the generator 25 does not change, but the components of current flowing between the generator 25 and the lines 15, 17 and 19 90° out of phase with the voltages $E_{ao}$, $E_{bo}$ and $E_{co}$, that is the imaginary components of current, do change. When the real components of current flowing from the generator 25 to the lines 15, 17 and 19 are increased, the real components of current in phase with the voltages $E_{ao}$, $E_{bo}$ and $E_{co}$ in lines 15, 17 and 19 between the source 11 and the generator 25 are decreased. If the real components of current flowing in lines 15, 17 and 19 between the source 11 and the generator 25 were negative, that is, 180° out of phase with the voltages $E_{ao}$, $E_{bo}$ and $E_{co}$, then a decrease in the real components of current flowing between the generator 25 and the lines 15, 17 and 19 would cause a decrease in these negative real components of current. In a similar manner the imaginary currents flowing in the lines 15, 17 and 19 between the source 11 and the generator 25 can be decreased by changing the amplitudes of the imaginary components of current flowing between the generator 25 and the lines 15, 17 and 19.

The system of the present invention controls the excitation of the field winding 51 of the D.C. motor 23 in response to the real component of current flowing in line 15 between the source 11 and the generator 25 to reduce this component to a minimum and controls the excitation of the field winding 47 of the generator 25 in response to the imaginary component of current flowing in line 15 between the source 11 and the generator 25 to reduce this component to a minimum. When the current in line 15 is minimized in this manner, the currents in lines 17 and 19 will also be minimized. Thus the currents flowing in lines 15, 17 and 19 between the source 11 and the generator 25 and the power flowing from the source 11 to the load 13 directly over the lines 15, 17 and 19 are reduced to a minimum.

In the system of FIG. 1, a current transformer 29 is placed on line 15 to produce a voltage corresponding in phase and proportional in amplitude to the current $I_a$. This voltage produced by the current transformer 29 is applied to a comparison circuit 31 and to a comparison circuit 33. A transformer network 35 is connected to receive voltages from the lines 15, 17 and 19. The transformer network 35 produces a voltage in response to the voltages received from lines 15, 17 and 19 on an output channel 37 in phase with $E_{bc}$ and having a predetermined constant amplitude. This voltage is applied to the comparison circuit 31. The comparison circuit 31 generates a D.C. output voltage on a channel 39 which is proportional to that component of the voltage applied to the comparison circuit 31 from the current transformer 29 which is either in phase or 180° out of phase with the voltage on channel 37. If the voltage applied to the comparison circuit 31 from the current transformer 29 has a component in phase with the voltage on channel 37, the output voltage produced on channel 39 will be of one polarity and if the voltage applied to the comparison circuit 31 from the current transformer 29 has a component 180° out of phase with the voltage on channel 37, then the comparison circuit 31 will produce a voltage of the opposite polarity on channel 39. As shown in FIG. 2, the voltage $E_{bc}$ will either be in phase with the imaginary current $I_{ai}$ or 180° out of phase with it. Since the output voltage of the current transformer 29 is proportional to the current $I_a$ and has the same phase as the current $I_a$, and since the voltage on channel 37 is in phase with the voltage $E_{bc}$, the comparison circuit 31 will produce an output voltage having an amplitude proportional to the imaginary component of current flowing in line 15, and having a polarity representing the phase of the imaginary component of current flowing in line 15 relative to the voltage $E_{bc}$. The transformer network 35 also produces on an output channel 41 a voltage in phase with $E_{ao}$ and having a constant predetermined amplitude. This voltage on channel 41 is applied to the comparison circuit 33. The comparison circuit 33 is identical to the comparison circuit 31 and in response to the voltage applied from channel 41 and the voltage applied thereto from the current transformer 29 produces a D.C. output signal voltage on its output channel 43 having an amplitude proportional to that component of the output voltage of the transformer 29 which is in phase with the voltage applied to the comparison circuit 33 from the channel 41. Since the voltage on channel 41 is in phase with $E_{ao}$ and since the voltage applied from the transformer 29 represents in amplitude and phase the current $I_a$ in line 15, the component of the output voltage of the current transformer 29 which is in phase or 180° out of phase with the voltage on channel 41 will be proportional in magnitude to the current component $I_{ar}$, or in other words the real component of the current $I_a$ in line 15. Thus the comparison circuit 33 will produce on channel 43 a D.C. signal voltage proportional to the real current component $I_{ar}$. If the current $I_{ar}$ is in phase with the voltage $E_{ao}$, the comparison circuit 33 will produce a voltage of one polarity on channel 43, and if the current component $I_{ar}$ is 180° out of phase with $E_{ao}$, the comparison circuit 33 will produce a voltage of the opposite polarity on channel 43. The voltage on channel 39 representing $I_{ai}$ is applied to a voltage regulator 45 controlling the excitation of the field winding 47 of the A.C. generator 25. The voltage on channel 43 representing $I_{ar}$ is applied to a speed regulator 49 controlling the excitation of the field winding 51 of the D.C. motor 23. The voltage regulator 45 in response to the signal voltage on channel 39 changes the excitation of the field winding 47 of the A.C. generator 25 in a direction to reduce the imaginary current component $I_{ai}$ flowing in line 15. In this manner the component $I_{ai}$ is reduced to a minimum. The speed regulator 49 in response to the signal voltage on line 43 representing $I_{ar}$ changes the excitation of the field winding 51 of the D.C. motor 23 in a direction to reduce the real current component $I_{ar}$ in line 15, and in this manner the component $I_{ar}$ is reduced to a minimum. Thus the current $I_a$ in line 15 is reduced to a minimum and at the same time the action of the system in response to current $I_a$ will minimize the currents in lines 17 and 19. Thus power flowing from the source 11 to the load 13 directly through the lines 15, 17 and 19 is reduced to a minimum and most of the power is supplied to the load 13 through the D.C. motor 23 and the A.C. generator 25.

When the flow of power from the normal power source 11 is interrupted and the emergency source 27 is supplying all of the power to the load 13 via the D.C. motor 23 and the A.C. generator 25, the voltage regulator 45 controlling the excitation of the field winding 47 of the generator 25 controls the voltage of the power supplied to the load 13 and the speed regulator 49 controlling the excitation of the field winding 51 of the D.C. motor 23 controls the frequency of the power supplied to the load 13.

FIG. 3 is a circuit diagram of the comparison circuit used in the present invention such as the comparison circuits 31 and 33. As shown in FIG. 3, the input signal voltage to be compared is applied to the primary winding 52 of a transformer 53 and the reference voltage is applied to the primary winding 54 of a transformer 55. The secondary windings 56 and 58 of the transformers 53 and 55 are connected to a bridge network 57. The end terminals of the secondary winding 56 of the transformer 53 are connected to a pair of opposite terminals 59 and 61 of the network 57 and the end terminals of the secondary winding 58 of the transformer 55 are connected to the other pair of opposite terminals 63 and 65 of the network 57. The leg of the network 57 between the terminals 63 and 59 comprises a resistor 67 and a rectifier 69 connected in series with the rectifier 69 poled to allow current to flow from the terminal 63 to the terminal 59. The leg of the network between the terminals 59 and 65 comprises a resistor 71 and a rectifier 75 poled to permit current flow from the terminal 59 to the terminal 65. The leg of the network 57 between the terminals 65 and 61 comprises a series circuit of a resistor 77 and a rectifier 79, which is poled to permit current flow from the terminal 65 to the terminal 61. The leg of the network 57 between the terminals 61 and 63 comprises a resistor 81 and a rectifier 85, which is poled to permit current flow from the terminal 61 to the terminal 63. The secondary windings 56 and 58 are provided with center taps to which leads 87 and 89 respectively are connected. The circuit of FIG. 3 will produce across lines 87 and 89 a D.C. voltage which will have an amplitude proportion to those components of the voltages applied to the primary windings 52 and 54 which are either in phase or 180° out of phase. Thus the output voltage produced across lines 87 and 89 will be proportional to that component of the signal voltage applied to the primary winding 52 which is either in phase or 180° out of phase with the reference voltage applied to the primary winding 54, since the reference voltage applied to the primary winding 54 will be of constant amplitude. The polarity of the signal produced across lines 87 and 89 will depend upon whether the voltage applied to the primary winding 52 has a component in phase with the reference voltage applied to the primary winding 54 or 180° out of phase with this voltage.

FIG. 4 is a detailed circuit diagram illustrating the comparison circuits 31 and 33 connected together with the transformer network 35, the current transformer 29, and the lines 15, 17, and 19. As shown in FIG. 4, the transformer network 35 comprises three primary windings 90, 91 and 92 connected in Y across the lines 15, 17 and 19 and three secondary windings 94, 96 and 98 connected in Y and inductively coupled to the three primary windings 90, 91, and 92, respectively. The secondary winding 94 has voltage induced therein in phase with voltages $E_{ao}$ and the secondary windings 96 and 98 have voltages induced therein in phase with voltages $E_{bo}$ and $E_{co}$ respectively. The secondary winding 98 is connected to one side of the primary winding 100 of a transformer 99 and the secondary winding 96 is connected to the other side of the primary winding 100. Thus a voltage of constant amplitude in phase with $E_{bc}$ is applied across the primary winding 100 of the transformer 99. The primary winding 102 of a transformer 101 is connected between the center tap of the primary winding 100 of the transformer 99 and the secondary winding 94. Thus a voltage of constant amplitude in phase with $E_{ao}$ is applied to the primary winding 102 of the transformer 101. In this manner the transformer network 35 produces the output voltages in phase with $E_{bc}$ and $E_{ao}$. The transformer 99 is part of the comparison circuit 31 which comprises, as shown in FIG. 4, the secondary winding 105 of a transformer 107 and a bridge network 103 to which the secondary winding 105 and the secondary winding 104 of the transformer 99 are connected. The output from the current transformer 29 is applied to the primary winding 106 of the transformer 107. A resistor 109 is connected across the primary winding 106. The comparison circuit 31 produces its output voltage between the center taps of the secondary windings 105 and 104. The transformer 101 comprises a part of the comparison circuit 33, which includes in addition to the transformer 101 a secondary winding 113 of the transformer 107 and a bridge network 111, to which the secondary winding 113 and the secondary winding 108 of the transformer 101 are connected. The primary winding 106 of the transformer 107 is common to both comparison circuits 31 and 33. The output from the comparison circuit 33 is taken between the center taps of the secondary windings 113 and 108.

Figure 5:
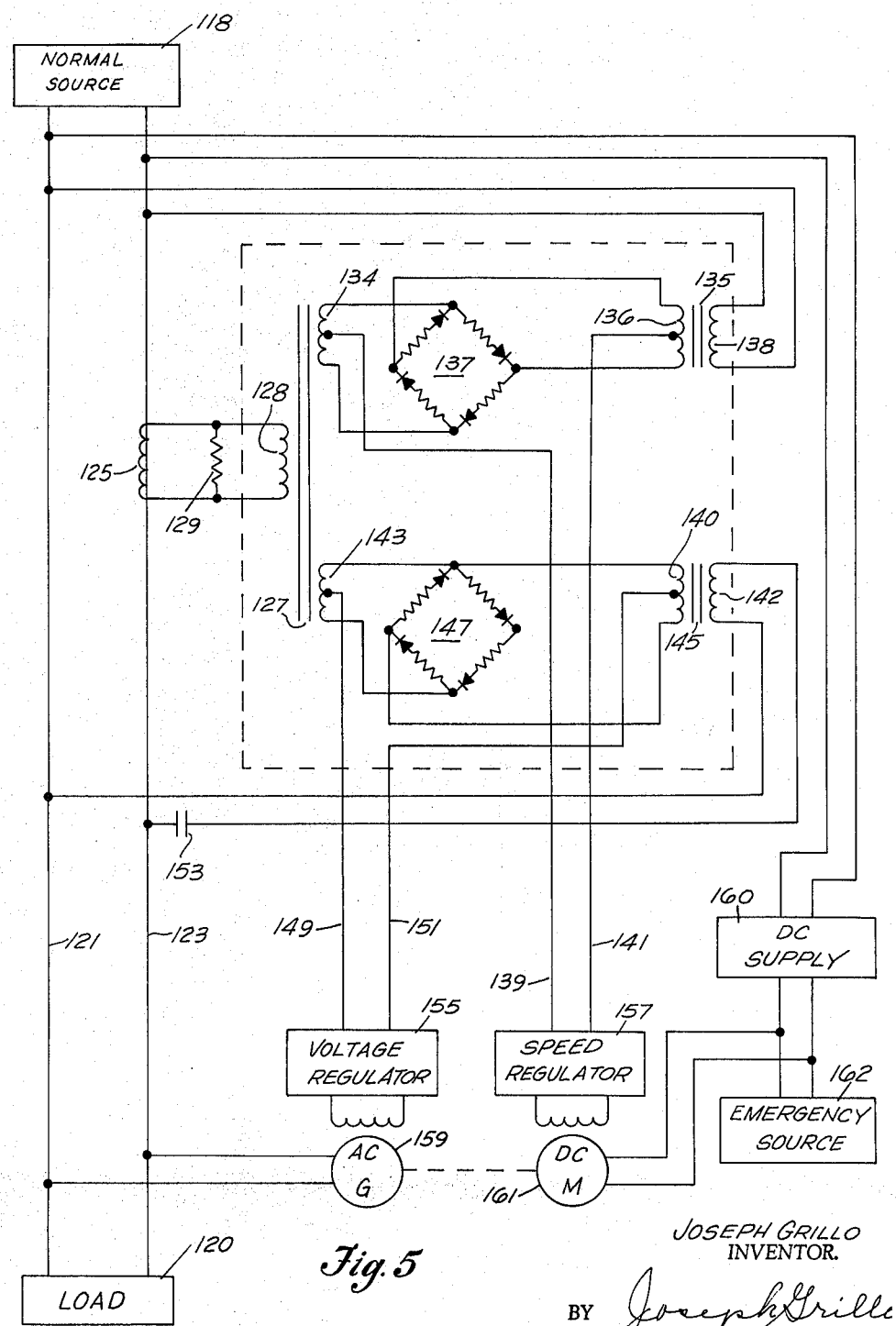
FIG. 5 is a circuit diagram of an embodiment of the invention in a single phase application.

The embodiment of the invention as described above is applied to a three-phase application, but the principles of the invention are also applicable to single phase applications. In a single phase application the comparison of the reactive component of current with a reference must be obtained by a 90° phase shift through a reactive impedance. This comparison can either be obtained by shifting the output of the current transformer 90° and comparing the resulting voltage with the voltage on the power lines or by shifting the voltage on the power lines through 90° and comparing this shifted voltage with the output voltage of the current transformer. FIG. 5 is a circuit diagram of a single phase embodiment of the invention in which the comparison of the imaginary current component in the line is obtained by shifting the line voltage through 90°. As shown in FIG. 5, the power lines connecting the normal single phase A.C. source 118 to the load 120 are designated by the reference numbers 121 and 123. A current transformer 125 produces an output voltage proportional to the current flowing in line 123 and in phase with the current flowing in line 123. The output voltage of the current transformer 125 is applied across the primary winding 126 of a transformer 127. The primary winding 126 is shunted by a resistor 129. The primary winding 126 constitutes a common input for two comparison circuits 131 and 133 of the type shown in FIG. 3. The comparison circuit 131 comprises a secondary winding 134 of the transformer 127, a transformer 135 and a bridge network 137, to which the secondary winding 134 and the secondary winding 136 of the transformer 135 are connected. The output from the comparison circuit 131 is produced across lines 139 and 141 which are connected to the center tap of the secondary winding 134 and the center tap of the secondary winding 136. The primary winding 138 of the transformer 135 is connected across the power lines 121 and 123 so that the comparison circuit 131 produces an output voltage proportional to the real current component in line 123 and having a polarity indicative of the phase of the real current component in line 123 relative to the voltage across lines 121 and 123. The comparison circuit 133 comprises a secondary winding 143 of the transformer 127, a transformer 145 and a bridge circuit 147 to which the secondary winding 143 and the secondary winding 140 of the transformer 145 are connected. The output voltage from the comparison circuit 133 is produced across lines 149 and 151 which are connected to the center taps of the secondary winding 143 and the secondary winding 140. The voltage across lines 121 and 123 is applied across the primary winding 142 of the transformer 145 through a capacitor 153 which shifts the voltage applied across the primary winding 142 90° from that across lines 121 and 123. As a result, the comparison circuit 133 produces across its output lines 149 and 151 a D.C. voltage proportional to the imaginary current component in line 123 and having a polarity indicative of the phase of this imaginary current component. The output voltage on lines 149 and 151 is applied to a voltage regulator 155 of a single phase A.C. generator 159 and the voltage output across lines 139 and 141 is applied to a speed regulator 157 of a D.C. motor 161 driving this A.C. generator. The A.C. generator 159 is connected across lines 121 and 123. Under normal conditions the motor 21 is energized by a D.C. supply 160 which draws its power from the normal source 118. When power flow from the source 118 is interrupted, the D.C. motor is energized by an emergency source 162. The regulators 155 and 157 in response to the output voltages from the comparison circuits 131 and 133 under normal conditions control the field excitations of the generator 159 and motor 161 to reduce the current in line 123 flowing through the current transformer 125 to a minimum in the same manner that the voltage regulator 45 and the speed regulator 49 control the field excitations of the generator 25 and the motor 23 to reduce the current in line 15 to a minimum. In this manner the power flowing from the source 118 to the load 120 directly through the power lines 121 and 123 is reduced to a minimum.

Figure 6:
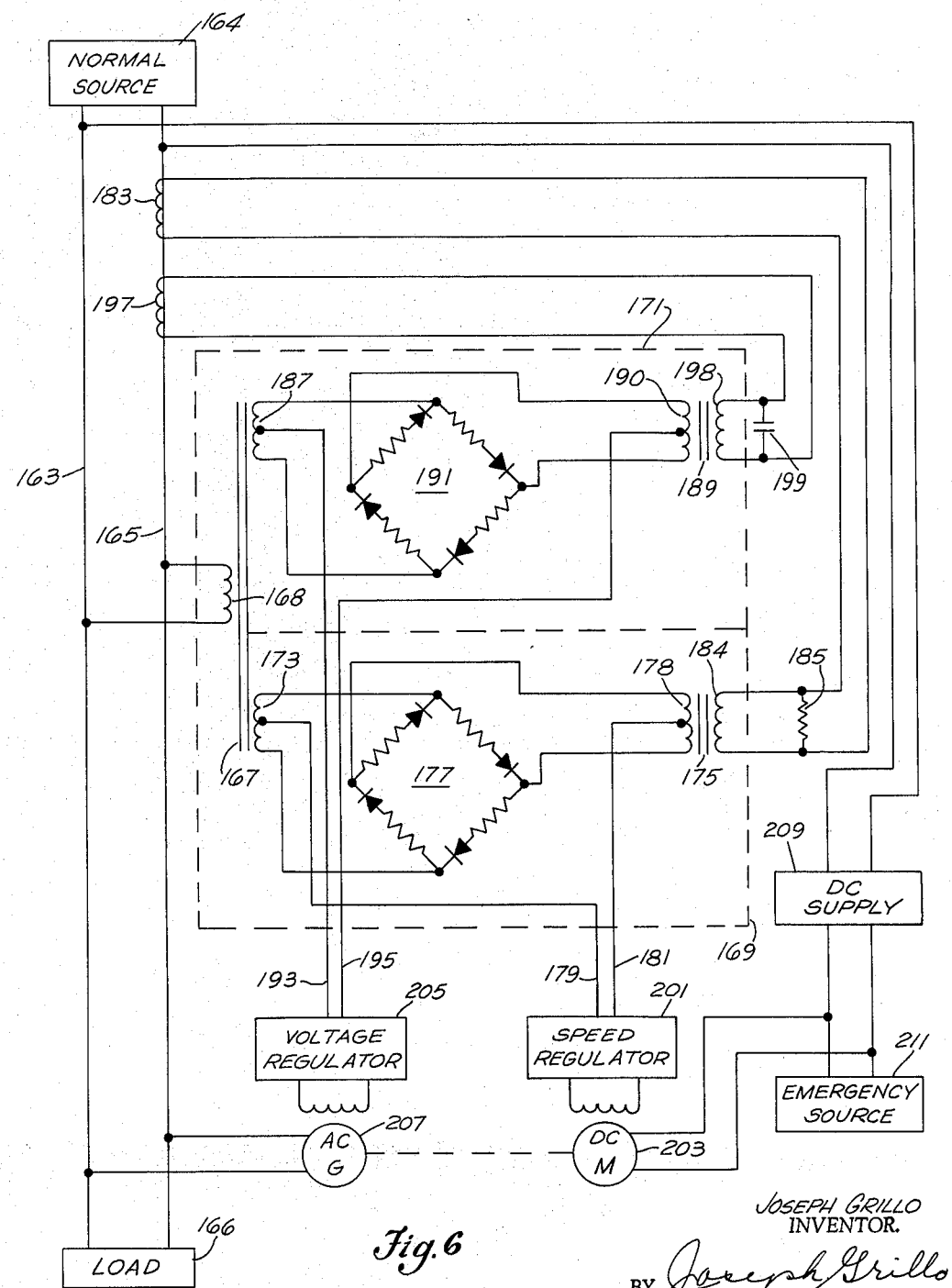
FIG. 6 is a circuit diagram of another embodiment of the invention in a single phase application.

FIG. 6 is a circuit diagram of another single phase embodiment of the invention in which the comparison with the imaginary line current component is obtained by shifting the output from a current transformer through 80°. As shown in FIG. 6, the power lines of the system are designated 163 and 165. The power lines 163 and 165 connect the normal single phase A.C. source 164 to the load 166. The voltage across the power lines 163 and 165 is applied to the primary winding 168 of a transformer 167. The primary winding 168 is the common input of two comparison circuits 169 and 171 of the type shown in FIG. 3. The comparison circuit 169 comprises a secondary winding 173 of the transformer 167, a transformer 175 and a bridge network 177 to which the secondary winding 173 and the secondary winding 178 of the transformer 175 are connected. The output voltage from the comparison circuit 169 is produced across output lines 179 and 181 which are connected to center taps of the secondary winding 173 and the secondary winding 178. A current transformer 183 on line 165 produces an output voltage in phase with the current in line 165 and having an amplitude proportional to the amplitude of the current in line 165. The output voltage of the current transformer 183 is applied across the primary winding 184 of the transformer 175, which is shunted by a resistor 185. As a result, the comparison circuit 169 will produce an output voltage across lines 179 and 181 proportional to the real current component in line 165. The comparison circuit 171 comprises a secondary winding 187 of the transformer 167, a transformer 189 and a bridge network 191 to which the secondary winding 187 and the secondary winding 190 of the transformer 189 are connected. The comparison circuit 171 produces its output voltage across output leads 193 and 195 which are connected to center taps of the secondary winding 187 and the secondary winding 190. A second current transformer 197 on line 165 produces an output voltage which is applied across the primary winding 198 of the transformer 189, which is shunted by a capacitor 199. The voltage applied across the primary winding 198 by the current transformer 197 will be proportional in amplitude to the current flowing in line 165, but because of the capacitor 199 the voltage applied across the primary winding 198 will be shifted in phase 90° from the current flowing in line 165. As a result the comparison circuit 171 will produce an output voltage across lines 193 and 195 having an amplitude proportional to the imaginary current component in line 165 and a polarity indicative of the phase of the imaginary current component in line 165. The voltage produced across lines 179 and 181 is applied to a speed regulator 201, which controls the field excitation of a D.C. motor 203 in response to the voltage across lines 179 and 181. A voltage regulator 205 receives the voltage across lines 193 and 195 and in response thereto controls the field excitation of a single phase A.C. generator 207, which is driven by the motor 203.

The output of the A.C. generator 207 is connected across power lines 163 and 165. The motor 203 is energized under normal conditions by a D.C. supply 209, which derives its power from the source 164. When the flow of power from the source 164 is interrupted, the D.C. motor 203 is energized from an emergency source 211. The voltage regulator 205 and the speed regulator 201 control the excitations of the generator 207 and the motor 203 under normal conditions to reduce the current flowing in the power line 165 to a minimum in the same manner that the voltage regulator 45 and the speed regulator 49 control the field excitations of the generator 25 and the motor 23 to reduce the current in line 15 to a minimum in the system in FIG. 1. Thus in the system in FIG. 6 most of the power will be transferred to the load 166 from the normal source 164 through the D.C. motor 203 and the A.C. generator 207.

Many modifications may be made to the above described embodiments of the invention without departing from the spirit and scope thereof.

What is claimed is:

1. A power system comprising:
a normal A.C. source;
a load;
power lines connecting said source to said load;
an A.C. generator having its output connected across said power lines;
drive means, energized from said source driving said A.C. generator; and
control means electrically connected between said power lines and said A.C. generator and the drive means therefor, said control means being responsive to the real component of current flowing in one of said power lines between said normal source and said A.C. generator to change the torque with which said driving means drives said A.C. generator in a direction to reduce said real component of current to a minimum and responsive to the imaginary component of current flowing in one of said power lines between said normal source and said A.C. generator to change the field excitation of said A.C. generator in a direction to reduce said imaginary component of current to a minimum.

2. A power system comprising:
a normal A.C. source;
a load;
power lines connecting said source to said load;
an A.C. generator having its output connected across said power lines;
a D.C. motor energized from said normal source connected to drive said A.C. generator; and
means responsive to the real component of current in one of said power lines between said normal source and said A.C. generator to change the field excitation of said D.C. motor in a direction to reduce said real component of current to a minimum and responsive to the imaginary component of current in one of said power lines between said normal source and said A.C. generator to change the field excitation of said A.C. generator in a direction to reduce said imaginary component of current to a minimum.

3. A power system comprising:
a normal A.C. source;
a load;
power lines connecting said source to said load;
an A.C. generator having its output connected across said power lines;
drive means, energized from said normal source, connected to drive said A.C. generator;
and control means electrically connected between said power lines and said A.C. generator and the drive means therefor, said control means including:
means to produce a first signal representing the amplitude and phase of the real component of current in one of said power lines between said normal source and said A.C. generator and a second signal representing the amplitude and phase of the imaginary component of current in one of said power lines between said source and said A.C. generator;

means responsive to said first signal to change the torque with which said drive means drives said A.C. generator in a direction to reduce said real component of current; and means responsive to said second signal to change the field excitation of said A.C. generator in a direction to reduce said imaginary component of current.

4. A power system comprising:
a normal A.C. source;
a load;
power lines connecting said source to said load;
an A.C. generator having its output connected across said power lines;
drive means, energized from said source, connected to drive said A.C. generator;
and control means electrically connected between said power lines and said A.C. generator and the drive means therefor, said control means including:

means to produce a first A.C. signal voltage having an amplitude proportional to the current in one of said power lines;

means to produce a first A.C. reference voltage shifted in phase from said first signal voltage by an amount equal to the phase difference between the voltage on said one of said power lines and the current on said one of said power lines between said normal source and said A.C. generator;

first comparison means to produce a second signal voltage representing the amplitude of the component of said first signal voltage which is in phase or 180° out of phase with said first reference voltage and representing the phase of such component relative to said first reference voltage;

means responsive to said second signal voltage to change the torque with which said drive means drives said A.C. generator to reduce the real component of current in said power lines to a minimum;

means to produce an A.C. third signal voltage having an amplitude proportional to the current in one of said power lines;

means to produce an A.C. second reference voltage shifted in phase from said third signal voltage by an amount equal to the phase difference plus 90° between the voltage and current on on the one of said power lines from which said third signal voltage is generated between said normal source and said A.C. generator;

second comparison means to produce a fourth signal voltage representing the amplitude of the component of said third signal voltage which is in phase or 180° out of phase with said second reference voltage and representing the phase of such component relative to said third reference voltage; and means responsive to said fourth signal voltage to change the field excitation of said A.C. generator in a direction to reduce the imaginary component of current flowing in said power lines between said normal source and said A.C. generator.

5. A power system as recited in claim 4 wherein said first and second comparison means each comprise:
a bridge network having first, second, third and fourth terminals with a leg between said first and second terminals comprising a rectifier poled to permit current flow from said first terminal to said second terminal;

a leg between said second and third terminals comprising a rectifier poled to permit current flow from said second terminal to said third terminal;

a leg between said third and fourth terminals comprising a rectifier poled to permit current flow from said third terminal to said fourth terminal; and a leg between said fourth and first terminal comprising a rectifier poled to permit current flow from said fourth terminal to said first terminal, and wherein:
said first signal voltage is applied across the first and third terminals of the bridge network of said first comparison circuit, said first reference voltage is applied across the second and fourth terminals of the bridge network of said first comparison circuit, said third signal voltage is applied across the first and third terminals of the bridge network of said second comparison circuit, and said second reference voltage is applied across the second and fourth terminals of the bridge network of said second comparison circuit.

6. A power system comprising:
a normal A.C. source;
a load;
power lines connecting said source to said load;
an A.C. generator having its output connected across said power lines;
drive means, energized from said source, connected to drive said A.C. generator;
and control means electrically connected between said power lines and said A.C. generator and the drive means therefor, said control means including:

means to produce an A.C. first signal voltage having an amplitude proportional to the current in one of said power lines;

means to produce an A.C. reference voltage shifted in phase from said first signal voltage by an amount equal to the phase difference between the first signal voltage by an amount equal to the phase difference between the voltage on said one of said power lines and the current on such power line between said normal source and said A.C. generator;

comparison means to produce a second signal voltage representing the amplitude of the component of said first signal voltage which is in phase or 180° out of phase with said reference voltage and representing the phase of such component relative to said reference voltage; and means responsive to said second signal voltage to change the torque with which said drive means drives said A.C. generator in a direction to reduce the real component of current in in said power lines between said normal source and said A.C. generator.

7. A power system as recited in claim 6 wherein said comparison means comprises:
a bridge network having first, second, third and fourth terminals with a leg between said first and second terminals comprising a rectifier poled to permit current flow from said first terminal to said second terminal;

a leg between said second and third terminals comprising a rectifier poled to permit current flow from said second terminal to said third terminal;

a leg between said third and fourth terminals comprising a rectifier poled to permit current flow from said third terminal to said fourth terminal; and a leg between said fourth and first terminal comprising a rectifier poled to permit current flow from said fourth terminal to said first terminal;

and wherein said first signal voltage is applied across said first and third terminals and said reference voltage is applied across said second and fourth terminals.

8. A power system comprising:
a three-phase normal A.C. source;
a load;
first, second and third power lines connecting the three phases of said normal source to said load;
a three-phase A.C. generator having its output connected across said first, second and third power lines;
drive means, energized from said normal source, connected to drive said A.C. generator;
and control means electrically connected between said power lines and said A.C. generator and the drive means therefor, said control means including:
    means to produce an A.C. first signal voltage in phase with the current in said first power line and having an amplitude proportional to the current in said first power line;
    means to produce a reference voltage in phase with the voltage between said second and third power lines;
    comparison means to produce a second signal voltage representing the amplitude of that component of said first signal voltage which is in phase or 180° out of phase with said first reference voltage and representing the phase of such component relative to said reference voltage; and
    means responsive to said second signal voltage to change the field excitation of said A.C. generator in a direction to reduce the imaginary component of current flowing in said first power line between said normal source and said A.C. generator.

9. A power system as recited in claim 8 wherein said comparison means comprises:
a bridge network having first, second, third and fourth terminals with a leg between said first and second terminals comprising a rectifier poled to permit current flow from said first terminal to said second terminal;
a leg between said second and third terminals comprising a rectifier poled to permit current flow from said second terminal to said third terminal;
a leg between said third and fourth terminals comprising a rectifier poled to permit current flow from said third terminal to said fourth terminal; and
a leg between said fourth and first terminals comprising a rectifier poled to permit current flow from said fourth terminal to said first terminal;
and wherein said first signal voltage is applied across said first and third terminals and said reference voltage is applied across said second and fourth terminals.

10. A power system comprising:
a normal three-phase A.C. source;
a load;
first, second and third power lines connecting the three phases of said normal source to said load;
a three-phase A.C. generator having its output connected across said first, second and third power lines;
drive means, energized from said normal source, connected to drive said A.C. generator;
and control means electrically connected between said power lines and said A.C. generator and the drive means therefor, said control means including:
    means to produce an A.C. first signal voltage in phase with the current in said first power line and having an amplitude proportional to the current in said first power line;
    means to produce a first reference voltage in phase with the voltage on said first power line;
    first comparison means to produce a second signal voltage representing the amplitude of that component of said first signal voltage which is in phase or 180° out of phase with said first reference voltage and representing the phase of such component relative to said first reference voltage;
    means responsive to said second signal voltage to change the torque with which said drive means drives said A.C. generator in a direction to reduce the real component of the current flowing in said first power line;
    means to produce a second reference voltage in phase with the voltage between said second and third power lines;
    second comparison means to produce a third signal voltage representing the amplitude of that component of said first signal voltage which is in phase or 180° out of phase with said second reference voltage and representing the phase of such component relative to said second reference voltage; and
    means responsive to said third signal voltage to change the field excitation of said A.C. generator in a direction to reduce the imaginary component of the current in said first power line to a minimum.

11. A power system as recited in claim 10 wherein said first and second comparison means each comprises:
a bridge network having first, second, third and fourth terminals with a leg between said first and second terminals comprising a rectifier poled to permit current flow from said first terminal to said second terminal;
a leg between said second and third terminals comprising a rectifier poled to permit current flow from said second terminal to said third terminal;
a leg between said third and fourth terminals comprising a rectifier poled to permit current flow from said third terminal to said fourth terminal; and
a leg between said fourth and first terminals comprising a rectifier poled to permit current flow from said fourth terminal to said first terminal;
and wherein:
    said first signal voltage is applied across said first and third terminals of the bridge network of said first comparison circuit,
    said first reference voltage is applied across the second and fourth terminals of the bridge network of said first comparison circuit,
    said first signal voltage is applied across the first and third terminals of the bridge network of said second comparison means, and
    said second reference voltage is applied across the second and fourth terminals of the bridge network of said second comparison circuit.

References Cited by the Examiner
UNITED STATES PATENTS

| | | | |
|---|---|---|---|
| 2,212,832 | 8/1940 | Holzler | 323—75 |
| 2,302,192 | 11/1942 | Dannheiser | 307—66 |
| 2,456,199 | 12/1948 | Lamb | 323—75 |
| 2,972,058 | 2/1961 | Kahle | 307—57 |

ORIS L. RADER, *Primary Examiner.*

L. R. CASSETT, T. J. MADDEN, *Assistant Examiners.*